United States Patent
Yake et al.

(10) Patent No.: US 7,594,985 B2
(45) Date of Patent: Sep. 29, 2009

(54) METHOD OF PREVENTING ADHERENCE OF A SECOND COATING TO A FASTENER PORTION

(75) Inventors: Donald L Yake, Bluffton, IN (US);
Timothy O Taylor, Marion, IN (US);
Brian Lombardo, Macomb Township,
MI (US); Edward D Murphy, Sparks,
MD (US); Rex Miller, Waterford, MI
(US); Leo R. Clor, Huntington, IN (US)

(73) Assignee: Newfrey LLC, Newark, DE (US)

( * ) Notice: Subject to any disclaimer, the term of this patent is extended or adjusted under 35 U.S.C. 154(b) by 813 days.

(21) Appl. No.: 11/191,624

(22) Filed: Jul. 28, 2005

(65) Prior Publication Data

US 2005/0258045 A1 Nov. 24, 2005

Related U.S. Application Data

(60) Division of application No. 10/441,843, filed on May 20, 2003, now Pat. No. 7,021,875, and a continuation-in-part of application No. PCT/US02/34608, filed on Oct. 30, 2002.

(60) Provisional application No. 60/458,865, filed on Mar. 28, 2003, provisional application No. 60/340,905, filed on Oct. 30, 2001, provisional application No. 60/391,809, filed on Jun. 25, 2002, provisional application No. 60/398,258, filed on Jul. 24, 2002.

(51) Int. Cl.
*C25D 13/10* (2006.01)

(52) U.S. Cl. .......................... 204/486; 427/410

(58) Field of Classification Search ................ 204/486; 427/410
See application file for complete search history.

(56) References Cited

U.S. PATENT DOCUMENTS

| 2,144,350 A | 1/1939 | Swanstrom |
| 2,144,553 A | 1/1939 | Simmonds |
| 2,167,285 A | 7/1939 | Smith |
| 2,237,595 A | 4/1941 | Dyer |
| 2,299,158 A | 10/1942 | Luce |
| 2,333,386 A | 11/1943 | Murphy |
| 2,384,729 A | 9/1945 | Darby |
| 2,421,201 A | 5/1947 | Hallock |
| 2,421,278 A | 5/1947 | Luce |
| 2,429,833 A | 10/1947 | Luce |
| 2,469,311 A | 5/1949 | Poupitch |
| 2,575,594 A | 11/1951 | Reiner |
| 2,705,991 A | 4/1955 | Reiner |
| 2,707,507 A | 5/1955 | Tripp et al. |

(Continued)

FOREIGN PATENT DOCUMENTS

DE 3728219 3/1989

(Continued)

*Primary Examiner*—Kishor Mayekar
(74) *Attorney, Agent, or Firm*—Harness, Dickey & Pierce, P.L.C.

(57) ABSTRACT

Accordingly, this invention provides a fastener system which is weldable to a substructure that overcomes the problems and disadvantages of the fasteners of the prior art. Generally, a weldable fastener is disclosed that has a coating applied to at least one surface of the fastener. The coating functions to prevent the deposit of a further coating, particularly an electrodeposition coating, upon further processing.

18 Claims, 4 Drawing Sheets

U.S. PATENT DOCUMENTS

| | | | |
|---|---|---|---|
| 2,825,380 A | 3/1958 | Reiner | |
| 2,879,820 A | 3/1959 | Trzcinski | |
| 2,909,206 A | 10/1959 | Johnson | |
| 2,936,806 A | 5/1960 | Harper | |
| 2,968,329 A | 1/1961 | Reiner | |
| 3,140,738 A | 7/1964 | Johnson | |
| 3,189,076 A | 6/1965 | Adams | |
| 3,219,086 A | 11/1965 | Zahodiakin | |
| 3,259,164 A | 7/1966 | Hernadi | |
| 3,259,165 A | 7/1966 | Tobian et al. | |
| 3,322,177 A | 5/1967 | Phelan | |
| 3,363,084 A | 1/1968 | Busing | |
| 3,446,261 A | 5/1969 | Dey | |
| 3,671,710 A | 6/1972 | Coombs | |
| 3,695,324 A | 10/1972 | Gulistan | |
| 3,746,068 A | 7/1973 | Deckert et al. | |
| 3,757,828 A | 9/1973 | Frauenglass et al. | |
| 3,877,342 A | 4/1975 | Duchatellier | |
| 3,914,178 A | 10/1975 | Fineran et al. | |
| 4,015,650 A | 4/1977 | Anderson | |
| 4,193,435 A | 3/1980 | Frosch et al. | |
| 4,362,450 A | 12/1982 | Hasegawa et al. | |
| 4,377,359 A | 3/1983 | Peterson | |
| 4,462,710 A | 7/1984 | Leitner | |
| 4,490,083 A | 12/1984 | Rebish | |
| 4,632,944 A | 12/1986 | Thompson | |
| 4,652,468 A | 3/1987 | Gould et al. | |
| 4,701,348 A | 10/1987 | Neville | |
| 4,762,451 A | 8/1988 | Collins | |
| 4,798,507 A | 1/1989 | Olah | |
| 4,828,440 A | 5/1989 | Anderson et al. | |
| 4,830,557 A | 5/1989 | Harris et al. | |
| 4,835,819 A | 6/1989 | Duffy et al. | |
| 4,856,954 A | 8/1989 | Peterson | |
| 4,875,816 A | 10/1989 | Peterson | |
| 4,875,817 A | 10/1989 | Suzumura et al. | |
| 4,911,591 A | 3/1990 | Oaks | |
| 4,984,319 A | 1/1991 | Reynolds | |
| 5,022,804 A | 6/1991 | Peterson | |
| RE33,766 E * | 12/1991 | Duffy et al. | 427/195 |
| 5,096,349 A | 3/1992 | Landy et al. | |
| 5,096,350 A | 3/1992 | Peterson | |
| 5,137,406 A | 8/1992 | Cosenza | |
| 5,146,668 A | 9/1992 | Gulistan | |
| 5,193,643 A | 3/1993 | McIntyre | |
| 5,221,170 A | 6/1993 | Duffy et al. | |
| 5,405,228 A | 4/1995 | Reid et al. | |
| 5,423,646 A | 6/1995 | Gagnon | |
| 5,446,957 A | 9/1995 | Wu | |
| 5,542,158 A | 8/1996 | Gronau et al. | |
| 5,605,353 A | 2/1997 | Moss et al. | |
| 5,624,319 A | 4/1997 | Golczyk et al. | |
| 5,630,686 A | 5/1997 | Billmann | |
| 5,655,865 A | 8/1997 | Plank et al. | |
| 5,679,160 A | 10/1997 | Wallace et al. | |
| 5,750,190 A | 5/1998 | Woodhall et al. | |
| 5,918,727 A | 7/1999 | Wallace et al. | |
| 5,928,711 A | 7/1999 | Wallace et al. | |
| 5,961,264 A | 10/1999 | Postadan | |
| 6,027,568 A * | 2/2000 | Wallace et al. | 118/668 |
| RE36,681 E | 5/2000 | Rindeer | |
| 6,109,849 A | 8/2000 | Nagayama | |
| 6,141,837 A | 11/2000 | Wisniewski | |
| 6,146,071 A | 11/2000 | Norkus et al. | |
| 6,183,180 B1 | 2/2001 | Copple et al. | |
| 6,287,064 B1 | 9/2001 | Jhumra et al. | |
| 6,302,628 B1 | 10/2001 | Berecz et al. | |
| 6,357,980 B1 | 3/2002 | Lansinger | |
| 6,433,278 B1 | 8/2002 | Blank et al. | |
| 6,450,747 B1 | 9/2002 | Fischer | |
| 6,575,680 B2 | 6/2003 | Herb et al. | |
| 6,637,994 B2 | 10/2003 | Leistner | |
| 6,644,902 B1 | 11/2003 | Cutshall | |
| 6,758,645 B2 | 7/2004 | Curley et al. | |
| 2002/0182027 A1 | 12/2002 | Gauron | |
| 2003/0002950 A1 | 1/2003 | Jameson | |
| 2003/0202856 A1 | 10/2003 | Nilsen et al. | |
| 2004/0047705 A1 | 3/2004 | Cutshall | |
| 2004/0081530 A1 | 4/2004 | Lee | |
| 2004/0228700 A1 | 11/2004 | Clinch et al. | |

FOREIGN PATENT DOCUMENTS

| | | |
|---|---|---|
| DE | 4417397 | 11/1995 |
| DE | 4432550 | 11/1995 |
| DE | 19637935 | 4/1998 |
| DE | 19811532 | 9/1999 |
| EP | 0405025 | 1/1991 |
| EP | 1060826 | 12/2000 |
| EP | 1116890 A1 | 7/2001 |
| EP | 1202616 | 5/2002 |
| GB | 2041138 A | 9/1980 |
| WO | WO 97/35684 | 10/1997 |
| WO | WO 01/76811 A1 * | 10/2001 |
| WO | WO 03/038293 | 5/2003 |

\* cited by examiner

METHOD OF PREVENTING ADHERENCE OF A SECOND COATING TO A FASTENER PORTION

CROSS-REFERENCE TO RELATED APPLICATIONS

This application is a divisional application of U.S. patent application Ser. No. 10/441,843, filed on May 20, 2003 (now U.S. Pat. No. 7,021,875 issued on Apr. 4, 2006), which claims the benefit of U.S. Provisional Application No. 60/458,865, filed on Mar. 28, 2003. U.S. patent application Ser. No. 10/441,843 is a continuation-in-part application of PCT International Application PCT/US02/34608, which was filed in the U.S. Receiving Office on Oct. 30, 2002. PCT International Application No. PCT/US02/34608 claims the benefit of U.S. Provisional Application No. 60/340,905, filed on Oct. 30, 2001; U.S. Provisional Application No. 60/391,809, filed on Jun. 25, 2002; and U.S. Provisional Application No. 60/398,258, filed on Jul. 24, 2002. The disclosures of the above applications are incorporated herein by reference.

FIELD OF THE INVENTION

The present invention relates to a coated fastener and particularly to a welded coated fastener having a coating that resists the adherence of an electrodeposited coating. The present invention further relates to vehicle assembly methods and other assembly methods in which fasteners are attached and coupled together.

BACKGROUND OF THE INVENTION

With ever increasing design demands, flexibility and adaptivity of unibody construction is increasingly required in order to provide vehicles that meet broader customer needs. Increases in the number of components and structures that are coupled to the unibody construction have led designers to consistently add threaded fasteners to the unibody frame. Variation in manufacturing tolerances require that the fastener couple to the unibody frame in a way that allows a degree of positional adjustment during final assembly. This positional adjustment is provided by using a female fastener that is an encaged fastener. Typically, this takes the form of a nut or fastener encaged in a structure that is attached to the inner body frame. The cage is configured to provide the nut with a range of movement so that when a component is coupled to the frame, the alignment of the component and frame can be adjusted until they meet manufacturing standards.

Prior to coupling of the components to the frame, however, the frames typically are painted or coated using electrocoat e-coat or electrodeposition coating processes. To date, the step of electrocoating the frame often results in the electrocoat paint adhering to the fastener or, with a caged fastener, causes the fastener to adhere to the cage. This prevents the fastener from being adjustable within the cage and, therefore, causes tolerance problems in the final assembly of the product. In the case of threaded fasteners, the application of the electrocoat paint to the fastener's threads increases problems in the coupling of a mating fastener. To prevent the tolerance problems, post-process inspection after painting is required to ensure that the fasteners are not adhered to the cage or fastener thread. Should post painting of the threads occur or the fastener become adhered to the cage by the electrocoat coating, post-process rework must be conducted to clean the fastener.

SUMMARY OF THE INVENTION

Accordingly, this invention provides a fastener system that is weldable to a substructure that overcomes the problems and disadvantages of the fasteners of the prior art. Generally, a weldable fastener is disclosed that has a coating applied to at least one surface of the fastener. In one embodiment, the invention includes a threaded fastener in a fastener cage capable of fastening the fastener to a substructure, the cage having a coating which inhibits additional coatings, particularly an electrodeposition coating, from sticking to the cage.

In accordance with the teachings of another embodiment of the present invention, there is provided a weld stud assembly for use with a drawn arc welding system that overcomes the deficiencies of the prior art. The weld stud assembly has a head having a weldment area defined on the weld stud head. A coating is provided to at least apportion of the threads of the weld stud assembly to inhibit the adhesion of paint to the threaded area.

In another aspect of the invention, a cage nut assembly has a body having a threaded bore, a cage enclosing at least a portion of the body and providing a limited range of movement to the body within the cage. The cage has a coating on a surface that is formulated to prevent the deposit of an electrodeposition coating during further processing involving the cage nut assembly.

In yet another aspect of the invention, a cage nut assembly has a body having a threaded bore, a cage enclosing at least a portion of the body and providing a limited range of movement to the body within the cage. The cage has a coating on a surface with the surface tension of the coating being greater than about 25 mNm$^{-1}$ and less than about 36 mNm−1.

The invention further provides a weldable metallic fastener with a flange configured to be welded to a surface and a threaded portion at least partially coated with a coating. The coating is applied as an aqueous composition including a binder, micronized polytetrafluoroethylene, and micronized polyethylene. The binder includes phenoxy resin, epoxy resin, or both. In a further embodiment, a weldable threaded fastener configured to be welded to a surface has a coating on a portion of the fastener, the coating including an epoxy material and polyethylene wax.

In another embodiment, a weldable metallic fastener having a base configured to be welded to a surface is coated with a coating comprising a binder component, a polyethylene wax, and polytetrafluoroethylene. The binder component may include an epoxy resin, a phenoxy resin, an acrylonitrile-butadiene-styrene [ABS] copolymer, a different styrenic component, another thermoplastic material, or combinations of these.

In yet another embodiment, a metallic fastener is coated with a coating including polytetrafluoroethylene and a binder selected from phenoxy resin, epoxy resins, and combinations of these.

In a method of the invention, an electrodeposition coating is prevented from being applied to a portion of a fastener that is configured to be coupled to a surface by coating a portion of the fastener with an epoxy coating including polyethylene wax. The fastener is fastened to a body, and the body is electrodeposition coated. The epoxy coating on the portion of the fastener resists wetting of the electrodeposition coating, so that the electrodeposition coating does not adhere or can easily be removed from that portion.

In a further method, a portion of a fastener configured to be coupled to a body is coated with a first coating. The first coating adheres to the fastener and prevents adhesion of a second coating. The fastener is then coupled to a body and the second coating is applied to the body. The second coating does not adhere to the areas of the fastener with the first coating.

In another embodiment, two articles are connected with a threaded fastener. A portion of the threaded fastener is coated with a first coating comprising a wax, then the threaded fastener is attached to a first article. A second coating is applied to the first article and fastener, but the second coating does not coat the portion coated with the first coating. Finally, a second article is connected to the first article with the threaded fastener.

In yet a further method a vehicle, such as an automotive vehicle is assembled by coating at least a portion of a weldable fastener with a first coating composition. The coating composition includes a component that provides the coating with a surface tension of up to about 30 mNm$^{-1}$. The fastener is welded to a vehicle component that is then coated by electrodeposition coating, in which step the electrodeposition coating does not substantially adhere onto the portion of the fastener that was coated with the first coating. By this we mean that the either no electrodeposition coating covers the portion or that any minor amount that might impinge on the portion can be easily removed, e.g. by brushing or knocking it off.

In a still further method, torqueing of a second fastener onto a first fastener is improved, particularly variation in applied torque is reduced compared to when an uncoated fastener is used, by coating a portion of the first fastener that interfaces with the second fastener with an epoxy coating that includes a polyethylene wax. In the method, the first fastener is coated with the epoxy coating including the wax, the fastener is fastened to a body, the body is coated by electrodeposition (which does not coat the coated first fastener portion), and, finally, the second fastener is coupled onto the first fastener.

Finally, the invention provides a method for applying an electrodeposition paint to a metallic fastener that is configured for coupling to a surface. A coating composition comprising epoxy resin and one or both of micronized polyethylene wax and micronized polytetrafluoroethylene is applied to a portion of the fastener and formed into a solid coating layer before the electrodeposition paint is applied. The electrodeposition paint does not substantially adhere to the coating layer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
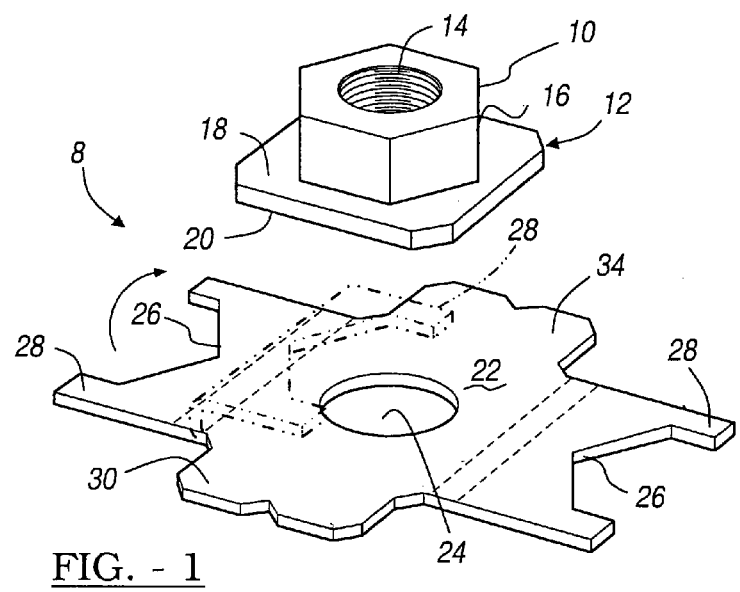
FIG. 1 is a perspective view of the cage nut fastener in its unassembled condition.

The following description of the preferred embodiment(s) is merely exemplary in nature and is in no way intended to limit the invention, its application, or uses. While the application describes a weldable cage fastener and a weldable stud, the application is equally applicable to any weldable or other fastener having a surface which resists the adherence of paint, and particularly electrodeposited paints known as electrocoat [e-coat] or ELPO systems.

The weldable threaded fastener 8 is configured to be coupled to a surface and has a coating on a portion of the threaded fastener. The fastener is configured to be welded to the surface. Optionally, the fastener is a weldable cage and the coating is on the body of the fastener. Optionally, the coating is on the cage and the fastener has a weldable base. For example, the threaded fastener is a welded stud or a welded nut.

The coating has a surface tension low enough so that a selected second coating, preferably an electrodeposition coating, will substantially not adhere to it. In a preferred embodiment, the coating has a surface tension of greater than 25 and less than 36 mNm$^{-1}$, and preferably greater than 27 and less than 32 mNm$^{-1}$, and most preferably about 28 mNm$^{-1}$, as measured using a Rame-Hart contact angle goniometer when calculated using harmonic mean. In a preferred embodiment, the coating comprises a binder, which includes at least one, but may include a plurality of resin components, and a component that provides the desired low surface tension to the surface of the coating. In describing the invention, "resin" may also, where appropriate, include "polymer" as well as oligomers and certain monomeric materials (e.g., the diglycidyl ether of bisphenol A) that are suitable for use in a coating binder.

The coating is formulated to prevent the deposit of a selected second coating, e.g. an electrodeposition coating, upon further processing. Although the coating includes a low surface tension binder component, e.g. a siloxane polymer for that purpose, a convenient way to so formulate a coating is to include a low surface tension solid that will come to the surface as the coating layer is formed. Suitable examples of materials that can provide the desired low surface tension include, without limitation, polyalkylene waxes, particularly polyethylene waxes, and poly(ethylene-copropylene); fluorinated polyalkylenes such as polytetrafluoroethylene and polyhexafluoropropylene; natural waxes such as montan and carnauba waxes; certain vinyl polymers, such as poly(vinyl fluoride), poly(vinylidene fluoride), and polymers of longer chain vinyl esters, such as poly(vinyl butyrate) and poly(vinyl octanoate); non-functional poly(oxyalkylene) waxes such as poly(oxyalkylene)-dimethylethers like poly(oxyethylene)-dimethylether waxes; poly(oxyalkylene)-block-poly(oxydimethylsilylene)-block-poly(oxyalkylene) solid copolymers; and combinations of these.

In another preferred embodiment, the coating comprises a mixture of polyethylene and polytetrafluoroethylene. Based on the combined weights of polyethylene and polytetrafluoroethylene, the coating contains about 20 to about 80 weight percent polyethylene, preferably about 30 to about 70 weight polyethylene, more preferably about 40 to about 60 weight percent polyethylene, the remainder being polytetrafluoroethylene.

It is believed that it is particularly beneficial to include a wax as at least a part of the surface tension-reducing component. Waxes provide the desired surface tension reducing properly to the coating, in addition, are likely to form a wax-rich layer at the surface of the coating because a wax will substantially melt at a typical baking temperature for the coating. In contrast, certain surface tension-reducing materials, for example poly (tetrafluoroethylene), would generally not be expected to melt and coalesce at typical coating bake temperatures.

Fluoropolymers used as a surface modifying component of the coating compositions of the invention include generally homopolymers and copolymers wherein the monomer of the homopolymer or at least one of the monomers of the copolymer contains fluorine. In a preferred embodiment, the fluoropolymers of the invention are prepared from perfluorinated monomers.

A preferred class of fluoropolymers includes homopolymers and copolymers of tetrafluoroethylene (TFE). The homopolymer of tetrfluoroethylene is known as polytetrafluoroethylene, and is commonly available as a line of Teflon® polymers of Dupont. In another embodiment, the fluoropolymers of the invention include copolymers of TFE with hexafluoropropylene (HFP). In another embodiment, fluropolymers are prepared by the copolymerization of TFE and perfluoroalkylvinyl ethers such as perfluoropropylvinyl ether. Other fluoropolymers of the invention include ethylene/tetrafluoroethylene copolymers, and polyvinylidene fluoride.

Fluoropolymers used in the coating layer of the invention may be prepared by known methods of solution or emulsion polymerization. The fluoropolymers may be used as emulsions, solutions, or as solid particles. Aqueous polyethylene and/or polytetrafluoroethylene dispersions are commercially available. In one embodiment, both polyethylene and polytetrafluoroethylene are included in the coating. The polyethylene is preferably from about 20 to about 80 weight percent, more preferably from about 40 to about 60 weight percent, based on the combined total weights of the polyethylene and polytetrafluoroethylene.

With reference to FIGS. 1-6, a weldable threaded fasteners 8 which are configured to be coupled to a surface are shown. The fastener has a coating layer 35 configured to resist the adhesion of electro-deposed paint. Generally, the coating 35 has a binder component and a surface tension reducing component that resists adhesion to the coated surface by a selected second coating, particularly by an electrodeposition coating.

Figure 2:
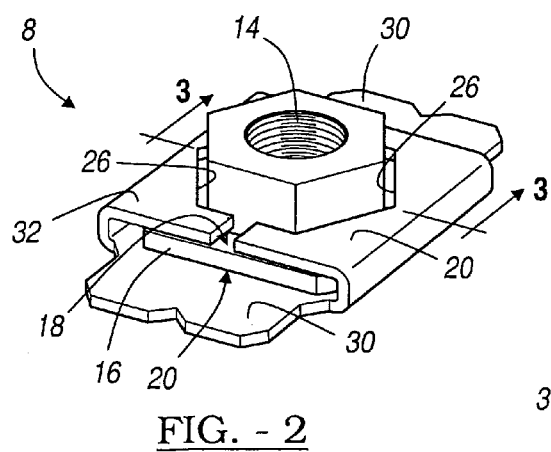
FIG. 2 is a perspective view of the cage nut of the present invention in its assembled configuration.
Figure 3:
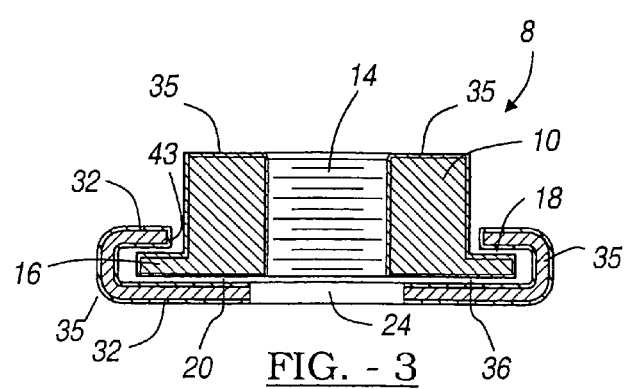
FIG. 3 is a cross-section of the cage nut in FIG. 2 showing the relationship of the coating with respect to the fastener and the cage.

With reference to FIGS. 1-3, a cage nut fastener, shown generally at 8, has a body 16 coupled to a planar base 12. The body 16 and planar base 12 define a threaded through bore 14. Planar base 12 has an upper base surface 18 and lower base surface 20. The cage nut assembly 8 further has a cage 22 which is generally disposed about the planar base 12. The cage 22 has a cage upper surface 34 and cage lower surface 32. Additionally, the cage 22 defines two pair of flanges 28. The flanges 28 define cutouts 26 which generally correspond to the shape of the body 16.

As can be best seen in FIG. 2, the flange elements 28 are folded to enclose the planar base 12 of the body 16. The flanges 28 are positioned so as to restrict the movement away from the cage 22 of the body 16. Additionally, the cutouts 26 are positioned so as to restrict the planar movement of the body 16 within the assembly.

The cage 22 is configured so the body 16 has a limited range of movement. As can be seen in FIGS. 2 and 3, the cage allows slight movement away from the cage upper surface 34 as well as allowing planar movement generally parallel to the cage upper surface 34. This planar movement is generally restricted and defined by the space between the cutouts and the body 16.

As best seen in FIG. 3, the cage 22 has a coating layer 35 (as described below) disposed on a surface which directly faces the hexagonal body 16 or planar base 12. This coating provides a surface that has a low wetability, and preferably has a lower wetability than the body 16. This significantly reduces the amount of wetting of any coatings subsequently sprayed onto the as coated cage 22. The coating preferably has a surface tension greater than about 25 $mNm^{-1}$ and less than about 36 $mNm^{-1}$. While the coating 35 is shown on the cage 22, it is envisioned that the coating 35 can equally be applied to the body 16 and/or the planar base 12. The coating layer 35 can cover the entire shank 112 or can cover a portion of the shank 112. Further, the coating layer 35 can be placed within the threads 117 while leaving the tips of the threads 121 exposed (see FIG. 6).

Figure 4:
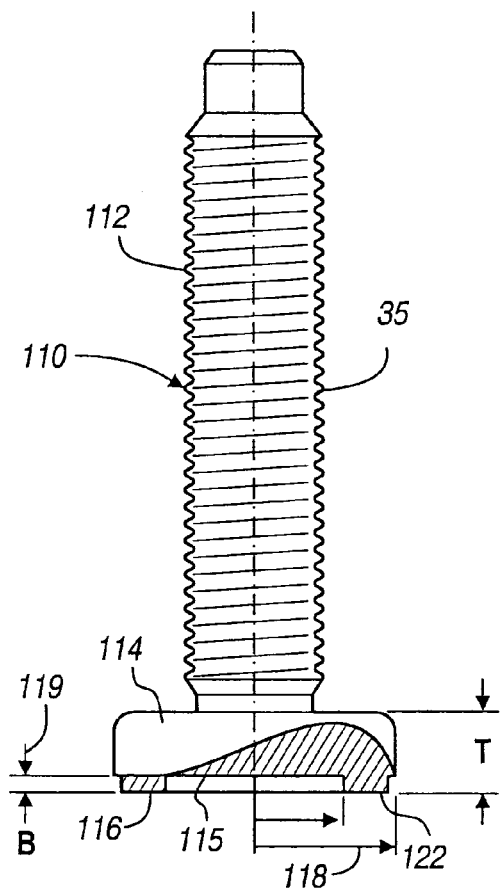
FIG. 4 is a side view of the drawn arc weld stud according to the teachings of the present invention.
Figure 5:
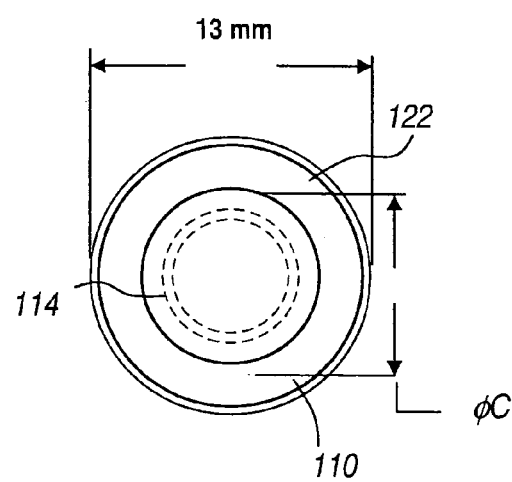
FIG. 5 is a bottom view of the drawn arc weld stud according to FIG. 4.

FIG. 4 represents the drawn arc weld stud 110 according to the teachings of the present invention. The weld stud 110 is formed of three major components; a shank 112, a head 114, and an annular weldment area 116. By way of non-limiting example, the shank 112 can be a M6 threaded fastener. Equally, the shank can take the form of pine-tree connector or other sized threaded fastener. The shank 112 defines a coating layer 35 (as described below) which resists to adherence of e-coat to the fastener.

The head 114 portion is formed using cold heading methodologies. The head 114 for a M6 fastener has an exterior diameter of about 13 mm and a thickness of about 2 mm. The head further has a flat lower surface 115 having a diameter of about 13 mm. The strength of the fastener is a function of the thickness of the head. As such, as the thickness of the head is increased, generally the strength of the fastener 110 is increased. Increasing the strength of the fastener often leads to an undesirable failure of the interface of the fastener and the laminate material. Such failures lead to the fastener being pulled out of the laminate material, leaving a hole in the thin sheet metal.

The annular weldment area 116 has an exterior radius 118 which equals the exterior radius of the lower surface 115 of the head 114. While an annular weldment area 116 is shown, it should be understood that standard circular weldment areas, are also applicable. For a M6 stud shank, the exterior radius of the head 114 is about 13 mm. The interior radius of the weldment area 116 has a radius of about 11 mm. The resulting weldment area being about 150 $mm^2$. Each head 114 has a thickness T. The thickness 119 of the weldment is approximately 20% to 35% of the value of T.

Figure 6:
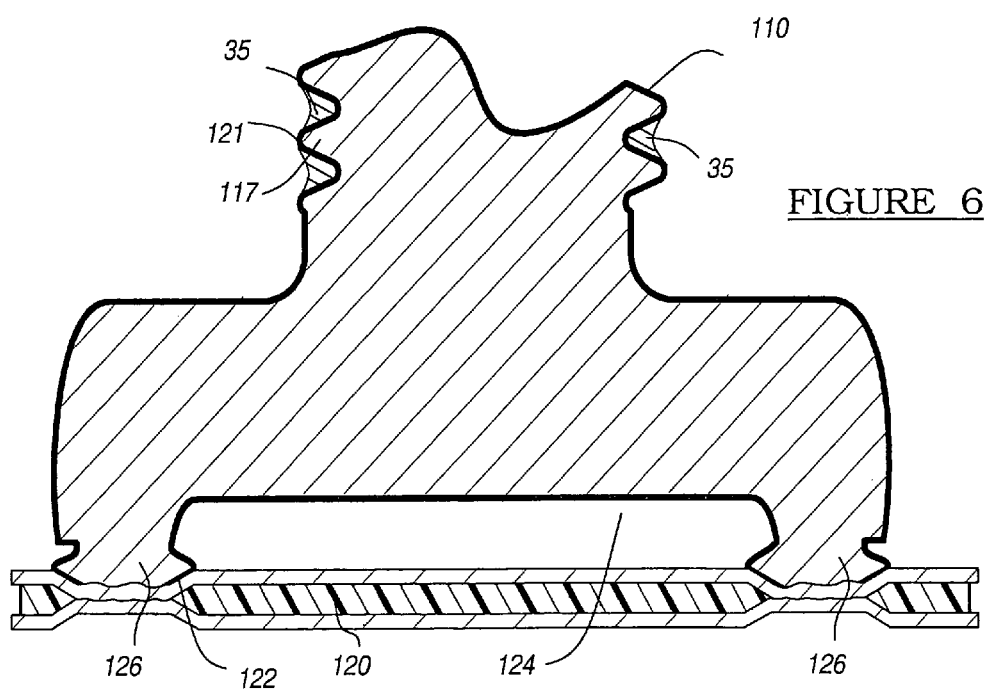
FIG. 6 is a side view of the drawn arc weld stud according to FIG. 4 being coupled to a laminate sheet.

To exemplify the application of this invention, FIG. 6 shows a fusion connection between a stud 110 and a laminate structure 120. The stud 110 corresponds in design to that of FIG. 4 before welding, and reference is made to the description of FIG. 6 to avoid repetition.

In use, the stud 110 of FIG. 6 is placed in contact with the laminate structure 120 with the flat edge 22 of the annular weldment area 116 touching the laminate structure 120. A welding current is then applied. After application of the welding current, the stud 110 is withdrawn to form an arc. While the arc is burning, both the flat edge 122 of the stud 110 and parts of the structure 120 melt. After a prescribed time, the stud 110 is plunged into the molten metal. The welding current is switched off before or during plunging. Then, the weld cools down. As shown in FIG. 6, part of the circumferential edge 122 has melted. Part of the molten metal has entered the cavity 124 defined by the annular weldment area. The weld is substantially annular. The stud 110 and the structure 120 have a common weld area 126 that has set. Of course, the other illustrated embodiments of this invention operate in similar fashion. After the welding of the stud to the structure, the coating layer 35, which has been exposed to a significant amount of heat, retains it capacity to resist the adherence of paint, and particularly e-coat paints.

The coating 35 of the invention functions to prevent or inhibit the deposit of an electrodeposition coating upon further processing. Preferred coatings have a surface tension such that they are poorly wetted by an aqueous electrodeposition bath. In one aspect, it is believed that the lower surface energy of the preferred coatings of the invention act to prevent deposition at least in part by preventing the surface of the coated part from being wetted by the electrodeposition bath. The coating 35 may be used to prevent adhesion of other selected second coatings that are applied to uncoated areas of the fastener and/or the articles to which the fastener is attached.

In one embodiment, the binder component of the coating used to prevent adhesion of a further coating layer preferably comprises epoxy resin. The epoxy resin is selected to provide desirable coating properties, e.g. good adhesion and good abrasion resistance so that the coating remains intact during fabrication with the fastener. In theory, many kinds of epoxy binders are suitable and provide such desirable coating properties. The epoxy binder may be thermoset, i.e., crosslinked, or, if of a suitably high molecular weight, may be thermoplastic. Specific examples of suitable epoxy resins include, without limitation, bisphenol A-type epoxy resins prepared from the reaction of bisphenol A and the diglycidyl ether of bisphenol A, epoxy novolac resins, phenoxy resins, such resins modified to be water-dispersible (for example, by reaction of terminal epoxide group or of hydroxyl groups with a dicarboxylic acid or a cyclic acid anhydride), and combinations of these. When the coating composition is formulated to be thermosettable, a suitable curing agent or crosslinker is included in the binder. Typical crosslinkers for epoxy resins include, without limitation, dianhydrides, polyamines and amino resins such as amino formaldehyde resins, polyisocyanate crosslinkers, and polyepoxides (for carboxyl-functionalized resins). In the case of aqueous coating compositions, the crosslinking resin may be mixed with a water-dispersible epoxy resin before dispersion in the aqueous medium. In a preferred embodiment, the crosslinkers are non-yellowing. Non-yellowing coatings may be desirable in some cases where appearance is at a premium, or where it is desired to further pigment the coating to provide a desired surface appearance.

In a preferred embodiment, the coating of the invention includes, based on combined weights of solid binder and surface tension-reducing component, from about 1 to about 50% by weight of the surface tension-reducing component. In a preferred embodiment, the surface tension-reducing component is present in an amount of about 5% by weight or greater, preferably about 10% by weight or more, more preferably from about 35% by weight or more, again based on combined weights of solid binder and surface tension-reducing component. The surface tension reducing component may be from about 1 to about 70%, more preferably from about 35 to about 60 percent by weight of the combined weights of solid binder and surface tension-reducing component. Preferably, the surface tension-reducing component is present at about 70% by weight or less, and more preferably at about 60% by weight or less, and even more preferably at about 50% or less, again based on the combined weights of solid binder and surface tension reducing component.

The total solids by weight of the coating compositions of the invention is chosen so as to deliver an appropriate amount of coating to the surface, and to provide a coating composition with suitable viscosity. The solids content may depend upon whether the coating composition is aqueous or solvent borne, as it is generally desirable to minimize organic emissions. For example, preferred coatings 35 may be applied at a weight of about 2 to 9 g/sq. ft., preferably about 3 to 5 g/sq. ft. Generally the percent by weight of the solids in a preferred aqueous coating composition ranges from about 10% to about 65%. In another embodiment, referring still to aqueous compositions, the compositions have 20% or more by weight solids, preferably 30% or more and more preferably 35% or more by weight solids. Preferably, the maximum weight percent solids is 65%, more preferably 60%. In other preferred embodiments, the weight percent solids is 50% or less. In a preferred embodiment, the solids are 45% or less by weight percent. In addition to the solids, the coating compositions of the invention contain from 1 to 40% water, preferably from 5-30% water.

The aqueous coating compositions of the invention may also contain organic solvents to promote a stable dispersion of the binder. In a preferred embodiment, the compositions contain 30% or less organic solvents, preferably 25% or less. As a general rule, the compositions may contain a minimum of 1% organic solvents, preferably a minimum of 10% by weight organic solvent. Non-limiting examples of volatile organic cosolvents to be used in the coating compositions include propanol, butanol, ethylene and propylene glycol ethers and ether acetates and 1-(2-butoxyethoxy) ethanol.

In addition to the solvents, resin, and surface tension modifier, the compositions used to form the coating of the invention can contain further components such as pigments, rheology modifiers, and other conventional additives. For example, inorganic pigments such as titanium dioxide, iron oxides, and other oxide pigments or organic pigments may be added to the coating compositions to provide a desired level of pigmentation in the coatings.

In another embodiment, the coating compositions of the invention can contain, in addition to the epoxy resin, a second resin or resins that provide further advantages. In a preferred embodiment, the coating contains a thermoplastic polymer selected from the group consisting of thermoplastic elastomer polymers, a styrenic component such as styrenic copolymers, ABS and SAN, a vinyl polymer such as a polyvinyl ester or a poly(vinyl chloride), or other polymers.

Elastomeric polymers include generally polymers based on diene functional monomers such as, without limitation, butadiene and isoprene. Non-limiting examples of such polymers include acrylonitrile butadiene elastomer (NBR), butyl rubber (IRR), isobutylene-isoprene elastomer, ethylene-propylene-diene terpolymer (EPDM), ethylene/butane elastomer, ethylene/octane elastomer, isobutylene-paramethylstyrene elastomer (IMS), polybutadiene elastomer (BR), polyisobutylene, polyisoprene (IR), and styrene-butadiene rubber (SBR). Such elastomeric polymers may be provided as solutions, suspensions, or in a preferred embodiment as particles. The polymers may be prepared by known processes by copolymerizing neat monomers, or by carrying out the copolymerization by emulsion polymerization or in solution in organic solvents.

In another embodiment, toughened epoxy resins may be produced by the bulk polymerization of the epoxy in the presence of dissolved rubber or elastomeric polymers as described above. Alternatively, the compositions of the invention may be prepared by blending the epoxy resin and the rubber particles.

The coating compositions of the invention are generally heated or baked for a short period of time to dry, coalesce, and, if appropriate to effect cure or crosslinking, of the coating. In a non-limiting example, the coating may be baked to 375° F. peak metal temperature for 2-5 minutes. A typical bake cycle is 400-425° F. for 20-30 minutes. An appropriate bake cycle for a specific coating depends upon the binder component and may be determined by straight-forward testing.

In a preferred embodiment, the coating composition of the invention is prepared from EPC-1760 E-Coat Block product manufactured by Environmental Protective Coatings of Ostrander, Ohio. The E-Coat Block product typically contains less than 5% by weight dimethylethylanolamine and less than 12% by weight of volatile organic solvents such as n-butyl alcohol, butylcellosolve, and butylcarbatol. The compositions contain from about 38 to about 43% by weight solids and have a density of from about 8.8 to 9.2 pounds per gallon. As provided, the composition has a Zahn cup no. 2 viscosity of 35-45 seconds at 77° F.

In another embodiment of the invention, a metallic fastener 8 is disclosed having a protective surface coating. The coating 35 is formed from a coating containing as a binder epoxy resin, preferably comprising phenoxy resin, optionally combined with a second, thermoplastic polymer. The coating further contains micronized polyethylene wax, micronized polytetrafluoroethylene, and pigment material. The second thermoplastic polymer preferably includes acrylonitrile-butadiene-styrene copolymer, polyvinyl chloride polymer, or both. The micronized polyethylene wax and the micronized polytetrafluoroethylene in the coating have a weight ratio to each other of about 60 to about 40 weight percent micronized polyethylene to about 40 to about 60 weight percent micronized polytetrafluoroethylene. Preferably, the solid binder and the polyethylene and polytetrafluoroethylene coating have a weight ratio to each other of about 40 to about 60 weight percent binder to about 60 to about 40 weight percent of the polyethylene and polytetrafluoroethylene.

In another embodiment of the present invention, a fastener is coated with an aqueous coating composition. The aqueous coating comprises, as binder, dispersed epoxy resin, preferable comprising phenoxy resin, and optionally comprising a second thermoplastic resin. The binder may also include a bisphenol A-type epoxy resin. The aqueous coating composition further comprises micronized polyethylene wax, micronized polytetrafluoroethane, and a pigment material.

In another embodiment of the present invention, a method for applying electro-deposition paint to a metallic fastener 8 is disclosed. The fastener 8 is configured for coupling to a surface and has a coating 35 on a portion of the fastener with a protective coating composition as described above.

After applying the electro-deposition paint to a metallic fastener 8, the fastener and the protective coating precursor suspension are cured at about 400 degrees F. for about 30 minutes. After the fastener 8 is coupled to the structure, an electro-deposition paint is applied to the fastener. The portion of the fastener 8 coated with cured protective coating precursor defines a surface portion of the fastener where the electro-deposition paint will not contact metal of the fastener when the electro-deposition paint is applied.

In a particularly preferred embodiment, the fastener is coated with a composition including about 12 to about 20 weight percent binder particles comprising epoxy resin and thermoplastic resin, the epoxy resin phase derived from bisphenol A and epichlorohydrin, the thermoplastic resin phase derived from blended acrylonitrile-butadiene-styrene copolymer and polyvinyl chloride polymer; about 5 to 12 weight percent micronized polyethylene wax; about 2 to about 8 weight percent micronized polytetrafluoroethane; about 2 to about 20 weight percent pigment; about 25 to about 65 weight percent water; about 50 to about 20 weight percent organic cosolvent; and about 0.5 to about 2 weight percent of a neutralizing amine. The coating coats a threaded region of the fastener. The fastener may be fastened, e.g. by welding, to a body prior to applying the coating composition.

The threaded second fastener attachment portion of the first fastener coated with the protective coating defines a surface portion of the first fastener where the electro-deposition paint is repelled when the electro-deposition paint is applied.

Referring to FIGS. 1-3, the cage nut has a body defining a threaded bore therethrough. A cage is disposed about at least a portion of the body. The cage provides a limited range of movement of the body within the cage. Further, the cage has a coating on at least one surface which has a surface tension of greater than 25 and less than 36 $mNm^{-1}$ and preferably greater than 27 and less than 32 $mNm^{-1}$ and most preferably about 28-29 $mNm^{-1}$, as measured using a Rame-Hart contact angle goniometer when calculated using harmonic mean. The body has a planar base while the cage defines a pair of flanges which cover at least a portion of the base. The coating is disposed between the flanges and the base.

The cage has flange members disposed about a least a portion of the body and is configured to limit the range of motion of the body. The body is disposed on the cage upper surface. The cage has at least one surface coated with a layer which is configured to function to prevent the deposit of an electrodeposition coating upon further processing and has a lower surface and the coating is further disposed on the lower surface.

In one embodiment, a weldable threaded fastener configured to be welded to a surface has a coating on a portion in which coating includes at least an epoxy material and a wax, preferably a polyethylene wax. The coating preferably further includes polytetrafluoroethylene at its surface. The coating may be thermoplastic or cured. The coating preferably has a surface tension of from about 27 $mNm^{-1}$ to about 32 $mNm^{-1}$. The coating may be on a body portion of the fastener. When the fastener has a weldable cage, such as described with reference to the figures, the coating may be on the cage.

In another embodiment, the present invention provides a method of preventing e-coat from being applied to a fastener, a fastener being configured to be coupled to a surface. The method contains the steps of: a) coating a portion of the fastener with an epoxy coating including a wax, particularly a polyethylene wax; b) fastening the fastener to a body; and c) e-coating the body, wherein the coating functions to resist wetting of the e-coat. Optionally, fastening the fastener body is welding the fastener to a body such as welding a cage of a cage nut to the body.

The wax may include a polyfluoroethylene component. For example, a mixture of polyethylene wax and polytetrafluoroethylene may be in the applied coating composition. The coating formed therefrom will have both polyethylene and polytetrafluoroethylene at its surface. If the applied coating is baked, the polyethylene may melt and coalesce, and the coalesced polyethylene may include particulate polyethylene or (if the bake temperature is high enough) may be a mixture of polyethylene and polytetrafluoroethylene. Preferably, a sufficient amount of polyethylene and, optionally, polytetrafluoroethylene is included in the coating to provide a surface tension of less than 36 mNm$^{-1}$.

The portion of the fastener coated is preferably a threaded portion or a bearing region. The coating may contain a pigment as desired, for example to provide a desired color or gloss.

In a variation of the invention, a portion of a fastener configured to be coupled to a body is coated with a first coating. The first coating adheres to the fastener and prevents adhesion of a second coating. The fastener is then coupled to a body and the second coating, which, for example and without limitation, may be an electrodeposition coating or other aqueous coating, is applied to the body. The second coating does not adhere to the areas of the fastener with the first coating. The fastener may be coupled with the body in any conventional way, including welding, gluing, screwing, riveting, by sliding into a slot, as part of a threaded nut and bolt or screw combination, and so on. The fastener may be coupled to the surface of the body in some coupling methods or may extend through the surface in other methods.

This method may be applied to a method in which two articles are connected with a threaded fastener. A portion of the threaded fastener is coated with the first coating, which preferably includes a wax, then the threaded fastener is attached to a first article. A second coating is applied to the first article and fastener, for example by an electrodeposition coating process, but the second coating does not coat the portion coated with the first coating. Finally, a second article is connected to the first article with the threaded fastener. The first coating may be thermoset. Among suitable thermoset coatings containing a wax are epoxy coatings. One preferred epoxy coating contains a phenoxy resin, which may be thermoplastic or thermoset. The first coating may have a particulate surface component, which may be micronized polyethylene or another low surface tension material that aids in preventing the first coating from being coated by the second coating. It is preferred for the coating to contain both polyethylene and polytetrafluoroethylene, for example in the relative amounts described above. Such coatings as these can be expected to be abrasion resistant. Thus, the coating on the fastener will not be substantially scraped off of the fastener during critical periods of the fabrication process. The fastener may be weldable, as the fasteners illustrated in the Figures.

A vehicle, such as an automotive vehicle, may be assembled by including these method steps. At least a portion of a weldable fastener may be coated with a first coating composition before the fastener is welded to a vehicle component. The coating composition includes a component that provides the coating with a surface tension of up to about 30 mNm$^{-1}$. The vehicle component is then coated by electrodeposition coating. Because of the first coating, the electrodeposition coating does not substantially adhere onto the portion of the fastener with the first coating. By this we mean that the either no electrodeposition coating covers the portion or that any minor amount that might impinge on the portion can be easily removed, e.g. by brushing or knocking it off.

The first coating may be applied as an aqueous coating composition, which would generally contain a minor amount, for example from about 1% to about 40% by weight, of the component that provides the coating with a surface tension of up to about 30 mNm$^{-1}$. Polymeric materials for providing the desired surface tension have been described; preferably the component includes a wax, such as polyethylene wax, and/or polytetrafluoroethylene.

In another embodiment of the present invention, a method of improving the torqueing of a second fastener onto a first fastener. The first fastener is coupled to a body and is coated with an electro-deposition paint. The method contains the steps of: a) coating a portion of the first fastener with epoxy, preferably comprising a phenoxy resin, and a wax, particularly a polyethylene wax; b) fastening the fastener body; c) coating the body with electro-deposition paint, wherein the coating functions to resist the electro-deposition paint; and coupling a second fastener onto the first fastener. The portion of the first fastener that is coated is a portion that interfaces with the second fastener during the coupling. The interfacing portion may be, for example, a portion of the first fastener body or a portion of the first fastener that is a threaded region. The coating makes it possible to couple the fasteners by applying a torque to the second fastener with a variation in torque less than 36 Nm, preferably less than 30 Nm. This smooth application of torque is particularly advantageous when the second fastener is coupled using the automated power tools typical of automotive assembly practices. The coating typically provides a surface tension of less than 36 mNm$^{-1}$ to the coated portion. The binder portion of the coating may further include a thermoplastic resin, such as ABS or PVC, as mentioned above. In some instances, it is advantageous for the wax to include polytetrafluoroethylene. The first fastener may be welded to the body, as when a cage of the first fastener is welded to the body.

The coating compositions preferably contain from about 15% to about 35%, preferably between about 20% and about 30% epoxy resin. In a non-limiting example, the coating composition contains about 26% by weight epoxy resin. In one embodiment, a coating composition is provided according to the present invention that forms a wax-rich surface.

Figure 7:
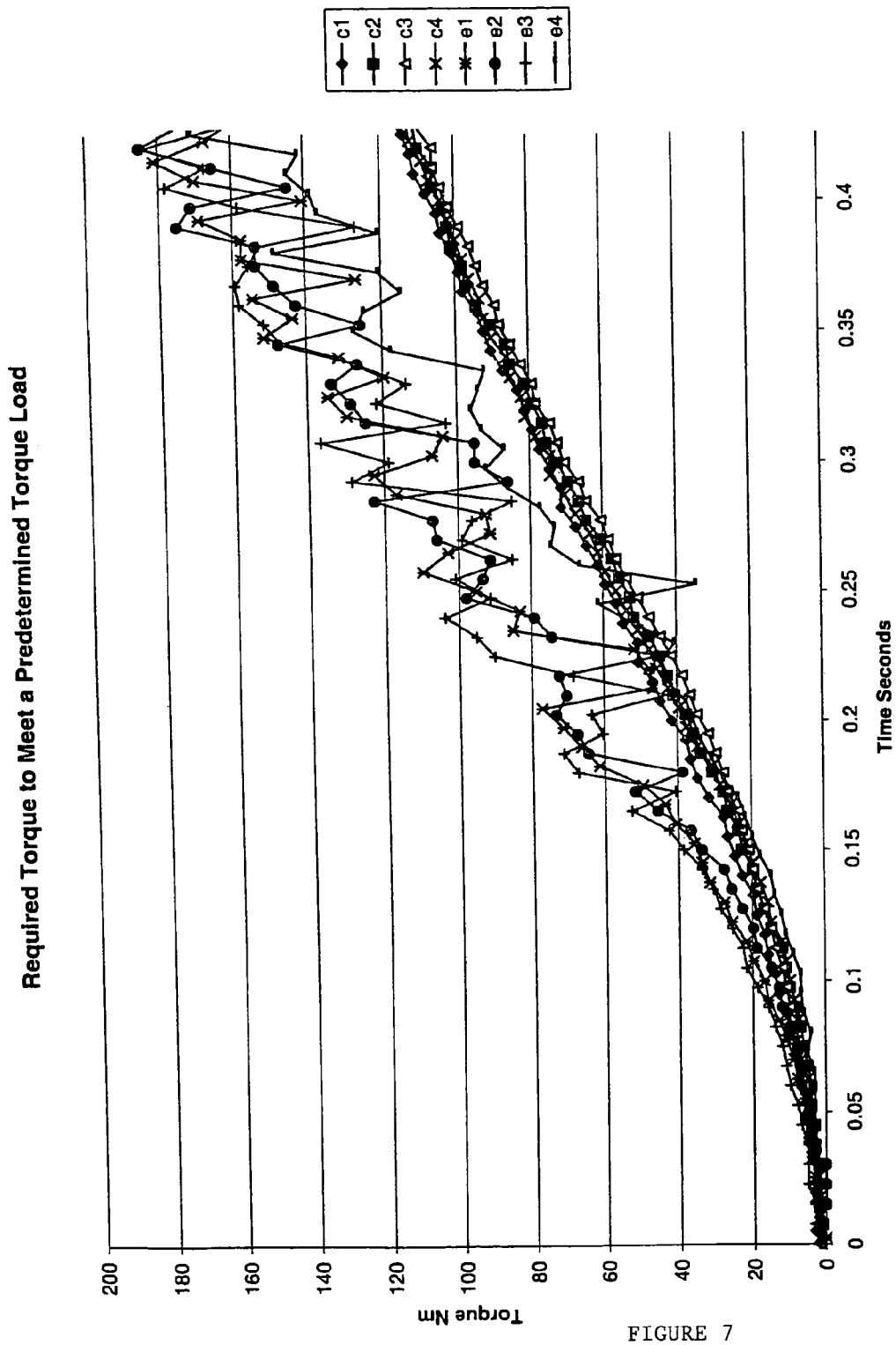
FIG. 7 represents a chart depicting the required torque to meet a predetermined torque load.

FIG. 7 represents a chart depicting the torque in Nm required to couple a nut onto a coated threaded stud. Plots c1 through c4 represent the torque required to couple a nut onto a threaded stud coated with the coating according to the teachings of the present invention and subsequently coated with an electrodeposition paint. Plots e1 through e4 represent the torque required to couple a nut onto a threaded stud having an electrodeposition coating.

As can clearly be seen from the plots, those studs having electrodeposition coatings require significantly varying torque loads to couple the fasteners. As commercial fastener systems measure the torque load applied to the fastener to determine when a predetermined clamp load is reached, variations in the applied torque loads lead to corresponding undesirable variations in clamp load of a fastened joint. By reducing variation in the torque load, better fastening of joints can be accomplished.

As can be seen in Plot c1 through c4, those studs having the coating layer according to the teachings of the present invention require significantly smoother torque loads to couple with a threaded fastener. Generally, those torque loads are lower than those of the e-coated fasteners e1-e4.

The variations in torque load are caused by marring and gauling of the e-coat layers between the threads. Variations of the torque are shown to reach greater than 30 Nm and even shown to be greater than 36 Nm when measured at intervals of 0.0075 seconds. As such, the coatings of the present invention are configured to provide variations of torque of less than 35 Nm, and preferably less than 30 Nm, and preferably less than 10 Nm, and most preferably less than 5 Nm when measured at 0.0075 second intervals.

One advantage of the coating compositions of the invention is that when they are applied to the surface to be coated, the coatings can withstand the harsh conditions and high temperatures associated with welding a coated part to a metal plate or other part of the assembly. For example, to attach a weld stud to a metal plate requires that at least the metal at the end of the stud in contact with the metal plate be heated to a temperature sufficient to melt the metal. Because the stud is generally made from a material that conducts heat, it is to be expected that during the welding process the weld stud as a whole is heated, including the layer of the stud directly below the organic coating of the invention. Nevertheless, the coating compositions of the invention provide an adequate coating that survives even the harsh welding conditions. In a subsequent step, the coatings of the invention adhering to the weld stud or other threaded fasteners of the invention act to prevent undesired deposition of electrocoat compositions in a subsequent electrodeposition step.

What is claimed is:

1. A method of preventing electrodeposition coating from being applied to a portion of a fastener, the fastener being configured to be coupled to a surface, the method comprising the steps of:
   a) coating a portion of the fastener with an epoxy coating comprising a micronized wax;
   b) welding the fastener to a body; and
   c) applying an electrodeposition coating to the body, wherein the epoxy coating functions to resist wetting of the electrodeposition coating on the coated portion of the fastener.

2. The method according to claim 1, wherein the epoxy coating comprises a polyfluoroethylene component.

3. The method according to claim 1, where coating a portion of the fastener is coating a threaded portion of the fastener.

4. The method according to claim 1, wherein a portion of a bearing region of the fastener is coated in step a).

5. The method according to claim 1, wherein the coating has a surface tension of less than 36 mNm$^{-1}$.

6. The method according to claim 1, wherein the fastener comprises a base configured to be welded to a surface and wherein coating a portion of the fastener is coating a portion of the fastener with a coating comprising polytetrafluoroethylene and a pigment.

7. The method according to claim 1, wherein welding the fastener to a body comprises welding a cage.

8. A method of coating a fastener that is configured to be coupled to a body, the method comprising the steps of:
   a) coating a portion of the fastener with a first coating comprising epoxy having a micronized wax, wherein the first coating adheres to the fastener and further wherein the first coating comprises a component that prevents adhesion of a second coating;
   b) welding the fastener to a body; and
   c) applying the second coating to the body and the fastener, wherein the second coating does not adhere to the portion of the fastener coated with the first coating.

9. The method of coating a fastener according to claim 8, wherein the first coating comprises phenoxy resin.

10. The method of coating a fastener according to claim 8, wherein the first coating has a surface tension of greater that about 25 mNm$^{-1}$ and less than about 36 mNm$^{-1}$.

11. The method of coating a fastener according to claim 8, wherein the second coating is applied as an aqueous composition.

12. The method of coating a fastener according to claim 8, wherein the second coating is an electrocoat coating.

13. The method of coating a fastener according to claim 8, wherein a coated portion of the fastener comprises a threaded portion of the fastener.

14. A method of connecting two articles with a threaded fastener, the method comprising the steps of:
   (a) coating at least a portion of a threaded fastener with a first coating, wherein said first coating comprises an epoxy coating having a micronized wax;
   (b) welding the threaded fastener to a first article;
   (c) applying a second coating onto the first article and the fastener, wherein the second coating does not coat the portion of the threaded fastener coated with the first coating composition; and
   (d) connecting a second article to the first article with the threaded fastener.

15. The method according to claim 14, wherein the first coating is a thermoset coating.

16. The method according to claim 14, wherein the first coating comprises a phenoxy resin.

17. The method according to claim 14, wherein the first coating is abrasion resistant.

18. The method according to claim 14, wherein the second coating is applied by electro-deposition coating.

* * * * *